United States Patent
Chaudhuri et al.

(10) Patent No.: US 9,172,515 B2
(45) Date of Patent: Oct. 27, 2015

(54) METHOD AND SYSTEM FOR INTER-CELL INTERFERENCE COORDINATION IN WIRELESS NETWORKS

(71) Applicants: Saptarshi Chaudhuri, Bangalore (IN); Irfan Baig, Bangalore (IN)

(72) Inventors: Saptarshi Chaudhuri, Bangalore (IN); Irfan Baig, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 13 days.

(21) Appl. No.: 14/172,381

(22) Filed: Feb. 4, 2014

(65) Prior Publication Data

US 2014/0219197 A1 Aug. 7, 2014

(30) Foreign Application Priority Data

Feb. 5, 2013 (IN) .............................. 493/CHE/2013

(51) Int. Cl.
| | |
|---|---|
| *H04L 5/00* | (2006.01) |
| *H04W 52/24* | (2009.01) |
| *H04W 52/14* | (2009.01) |
| *H04B 17/26* | (2015.01) |
| *H04B 17/345* | (2015.01) |

(52) U.S. Cl.
CPC ............. *H04L 5/0032* (2013.01); *H04W 52/24* (2013.01); *H04W 52/243* (2013.01); *H04B 17/26* (2015.01); *H04B 17/345* (2015.01); *H04W 52/146* (2013.01)

(58) Field of Classification Search
CPC . H04L 5/0032; H04L 5/0035; H04W 52/243; H04W 72/08; H04W 52/146; H04W 84/045
USPC ................. 370/252, 328, 329, 331, 332, 345; 455/414.1, 436, 438, 446, 447, 450, 455/452.1
See application file for complete search history.

(56) References Cited

U.S. PATENT DOCUMENTS

| | | | |
|---|---|---|---|
| 8,412,256 B2 | 4/2013 | Lee et al. | |
| 2011/0117967 A1 | 5/2011 | Vedantham et al. | |
| 2011/0136494 A1 | 6/2011 | Kim et al. | |
| 2012/0021753 A1* | 1/2012 | Damnjanovic et al. | ........ 455/450 |
| 2012/0088506 A1* | 4/2012 | Zhou et al. | .................... 455/436 |
| 2012/0244871 A1 | 9/2012 | Zhao | |
| 2012/0250565 A1 | 10/2012 | Zhang et al. | |
| 2013/0059593 A1* | 3/2013 | Hu et al. | .................... 455/452.1 |

(Continued)

FOREIGN PATENT DOCUMENTS

WO  WO 2013/009233 A2  1/2013

*Primary Examiner* — Jamal Javaid
*Assistant Examiner* — Wali Butt
(74) *Attorney, Agent, or Firm* — Finnegan, Henderson, Farabow, Garrett & Dunner, L.L.P.

(57) ABSTRACT

A method, system, and non-transitory computer-readable storage medium for managing inter-cell interference in a wireless network is provided. The method may be executed by at least one processor at a small cell gateway and may include receiving, uplink interference power corresponding to a first small cell base station (SCBS). The method may further include receiving neighboring cell information of the first SCBS, the neighboring cell information including information on a first plurality of SCBSs neighboring the first SCBS. The method may further include determining based on the received uplink interference power, that the first SCBS is experiencing inter-cell interference and determining a second plurality of SCBSs from among the first plurality of SCBSs that are interfering with the first SCBS. The method may further include adjusting uplink power allocation corresponding to a second SCBS from among the second plurality of SCBSs.

24 Claims, 10 Drawing Sheets

(56) References Cited

U.S. PATENT DOCUMENTS

| | | |
|---|---|---|
| 2013/0084907 A1 | 4/2013 | Shen et al. |
| 2013/0090120 A1* | 4/2013 | Venkatraman et al. ....... 455/447 |
| 2013/0107798 A1 | 5/2013 | Gao et al. |
| 2013/0242920 A1* | 9/2013 | Wang et al. ................... 370/329 |
| 2014/0369285 A1* | 12/2014 | Li et al. ......................... 370/329 |

* cited by examiner

METHOD AND SYSTEM FOR INTER-CELL INTERFERENCE COORDINATION IN WIRELESS NETWORKS

CROSS-REFERENCE TO RELATED PATENT APPLICATION

The present application claims priority under 35 U.S.C. §119 to Indian Provisional Patent Application No. 493/CHE/2013, filed Feb. 5, 2013 in the Indian Patent Office. The entire disclosure of the above-referenced application is incorporated herein by reference in its entirety.

TECHNICAL FIELD

The disclosure generally relates to wireless networks and, more particularly, to coordinating inter-cell interference in wireless networks.

BACKGROUND

Rapid increases in the mobile subscriber base and the recent emergence of new applications (e.g., MMOG (Multimedia Online Gaming), mobile TV, Web 2.0, high definition video streaming), combined with an increasing level of penetration of data-intensive devices (e.g., smart phones, broadband enabled laptops, tablets and other devices), has resulted in the explosion of internet data traffic carried by mobile networks. To increase the capacity of a cellular network, small cell deployments are being investigated vigorously by industry and standardization bodies.

Generally, small cells (e.g., "nanocells" or "femtocells") may be personal miniature base stations installed on the subscriber's premises for providing cellular services within a home or enterprise. In contrast with a typical mobile macro cell which might have a range of up to several tens of kilometers, small cells may be low-powered radio access nodes that operate in licensed and unlicensed spectrums with a range of, for example, between ten meters to several hundred meters. Typically, small cells may be connected to the Internet and the cellular operator's core network via a small cell gateway ("SC-GW").

As an example, small cells are being implemented in wireless networks implementing the 3GPP Long-Term Evolution (LTE) standards. In 3GPP LTE standards, a small cell is termed as a Home eNodeB (HeNB) or small cell base station (SCBS). Throughout this document, HeNB and SCBS are used interchangeably to refer generically to a small cell or small cell base station. The HeNB is connected to the Evolved Packet Core (EPC) via the SC-GW.

Each SCBS may cater to multiple user equipments (UEs) or mobile terminals under its coverage area. UEs in a coverage area of one SCBS (e.g., within a given cell) may be subjected to interference from the UEs or mobile terminals from other SCBS coverage area or from surrounding macro base stations coverage area. As the number of UEs or mobile terminals increases, the magnitude of the interference may also increase. This interference may affect the quality of service of the application packets sent from UEs or mobile terminals to the SCBS, or vice versa, due to packet corruption or packet drop.

According to a conventional technique that has attempted to address this interference problem between different cells, neighboring SCBSs exchange power control and interference coordination messages with each other. Based on this message exchange, interference coordination takes place. However, such exchanging of interference coordination messages between SCBSs every time the resource allocation is done may be overwhelming for the SCBS given that, in some instances, SCBSs may be embedded devices with low capacity and processing power.

SUMMARY

Accordingly, there exists a need for techniques for improved inter-cell interference coordination in wireless networks such as LTE.

According to an exemplary embodiment, a method of managing inter-cell interference in a wireless network is provided. The method may be executed by at least one processor at a small cell gateway and may include receiving, by the at least one processor, uplink interference power corresponding to a first small cell base station (SCBS). The method may further include receiving, by the at least one processor, neighboring cell information of the first SCBS, the neighboring cell information including information on a first plurality of SCBSs neighboring the first SCBS. The method may further include determining, by the at least one processor, based on the received uplink interference power, that the first SCBS is experiencing inter-cell interference. The method may further include in response to determining that the first SCBS is experiencing inter-cell interference, determining, by the at least one processor, a second plurality of SCBSs from among the first plurality of SCBSs that are interfering with the first SCBS. The method may further include adjusting, by the at least one processor, uplink power allocation corresponding to a second SCBS from among the second plurality of SCBSs.

According to another exemplary embodiment, a non-transitory computer-readable storage medium is provided that stores instructions which when executed by at least one processor at a small cell gateway enable the at least one processor to execute a method of managing inter-cell interference in a wireless network. The method may include receiving, by the at least one processor, uplink interference power corresponding to a first small cell base station. The method may further include receiving, by the at least one processor, neighboring cell information of the first SCBS, the neighboring cell information including information on a first plurality of SCBSs neighboring the first SCBS. The method may further include determining, by the at least one processor, based on the received uplink interference power, that the first SCBS is experiencing inter-cell interference. The method may further include in response to determining that the first SCBS is experiencing inter-cell interference, determining, by the at least one processor, a second plurality of SCBSs from among the first plurality of SCBSs that are interfering with the first SCBS. The method may further include adjusting, by the at least one processor, uplink power allocation corresponding to a second SCBS from among the second plurality of SCBSs.

According to another exemplary embodiment, a system for managing inter-cell interference in a wireless network is provided. The system may include at least one processor and a memory storing instructions for execution by the at least one processor. The at least one processor may be configured by the instructions to receive uplink interference power corresponding to a first small cell base station. The at least one processor may be further configured to receive neighboring cell information of the first SCBS, the neighboring cell information including information on a first plurality of SCBSs neighboring the first SCBS. The at least one processor may be further configured to determine based on the received uplink interference power, that the first SCBS is experiencing inter-cell interference. The at least one processor may be further configured to, in response to determining that the first SCBS is experiencing inter-cell interference, determine a second plurality of SCBSs from among the first plurality of SCBSs that are interfering with the first SCBS. The at least one processor may be further configured to adjust uplink power allocation corresponding to a second SCBS from among the second plurality of SCBSs.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Exemplary embodiments of the present disclosure will be described with reference to the accompanying drawings. Wherever possible, the same reference numbers will be used throughout the drawings to refer to the same or like parts. While exemplary embodiments are described herein, modifications, adaptations, and other implementations are possible, without departing from the spirit and scope of the invention. Accordingly, the following detailed description does not limit the invention. Instead, the proper scope of the invention is defined by the appended claims.

Figure 1:
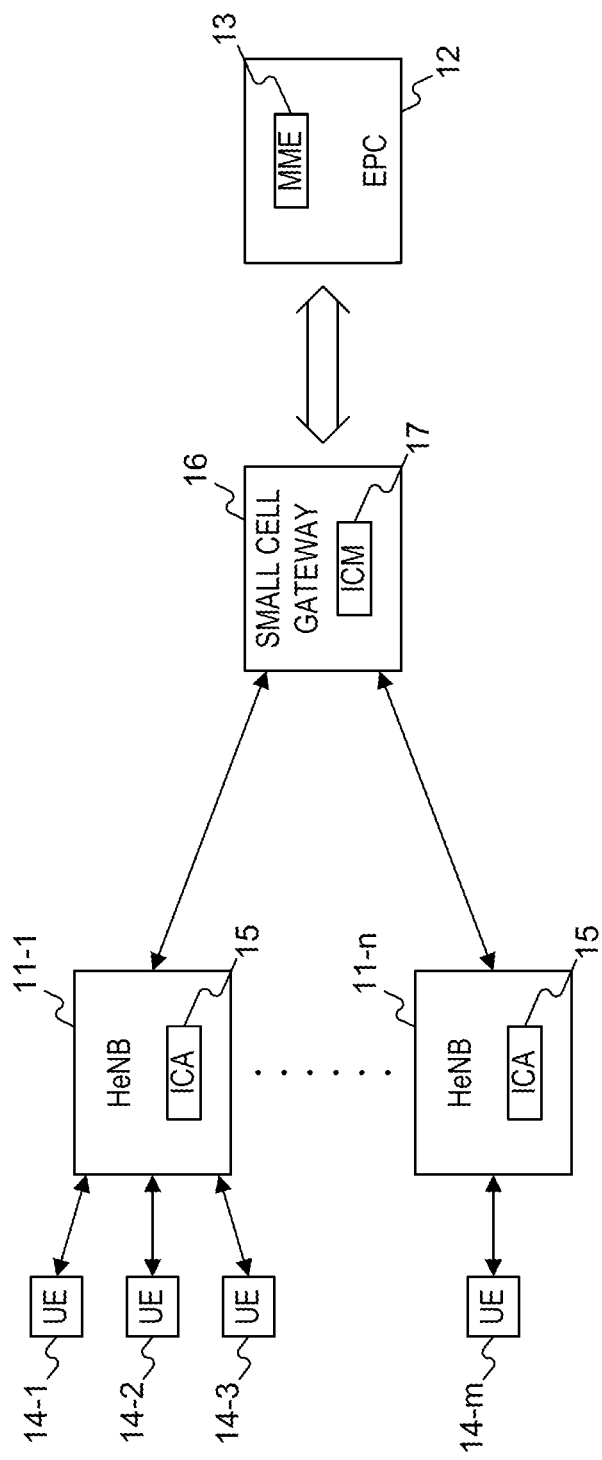
FIG. 1 illustrates an exemplary network architecture for a broadband wireless network.

An exemplary high level network depicting a broadband wireless network architecture is illustrated in FIG. 1. For purposes of illustration, the network of FIG. 1 corresponds to an LTE network. However, the depicted LTE network is merely an exemplary network, and thus it will be understood that the teachings of the disclosure contemplate other broadband wireless networks such as, for example, WiMax, High Speed Packet Access (3GPP's HSPA), etc.

In FIG. 1, one or more of UE 14-1, 14-2, 14-3, through 14-m (each also referred to as UE 14) may communicate wirelessly with one or more SCBSs 11-1 through 11-n (each also referred to hereinafter as SCBS 11 or HeNB 11). A UE may be any type of computing component that can communicate with an SCBS 11. For example, a UE may be a cell phone, PDA, tablet computer, or other user device. One or more of HeNBs 11 may communicate through a small cell gateway 16 (hereinafter referred to as SC-GW 16) to an evolved packet core (EPC) 12 that may include a Mobility Management Entity (MME) 13. The functionalities of HeNB 11, SC-GW 16, EPC 12, and MME 13 are well known in the art and a detailed explanation thereof is omitted here for conciseness. Briefly, the functionalities of HeNB 11 may include radio resource management header compression and encryption of user data stream, packet scheduling and transmission, physical layer processing, etc. MME 13 may be responsible for non-access stratum, ciphering and integrity protection, intercore network signaling, SAE (system architecture evolution) bearer control, handover, etc. EPC 12 may also include, among other things, a serving gateway (SGW) (not shown) and packet-data network gateway (PDN GW) (not shown).

In the network architecture of FIG. 1, depending on their location at a given time, the coverage area of HeNB 11-1 may overlap with the coverage area of one or more of HeNBs 11-2 through 11-n, resulting in interference between the HeNBs. For example, UEs 14-1, 14-2, or 14-3 in the coverage area of HeNB 11-1 may be subject to interference from UE 14-m supported by HeNB 11-n. This interference may affect the quality of service of the application packets sent from the UEs to the respective HeNBs or vice versa.

Figure 2:
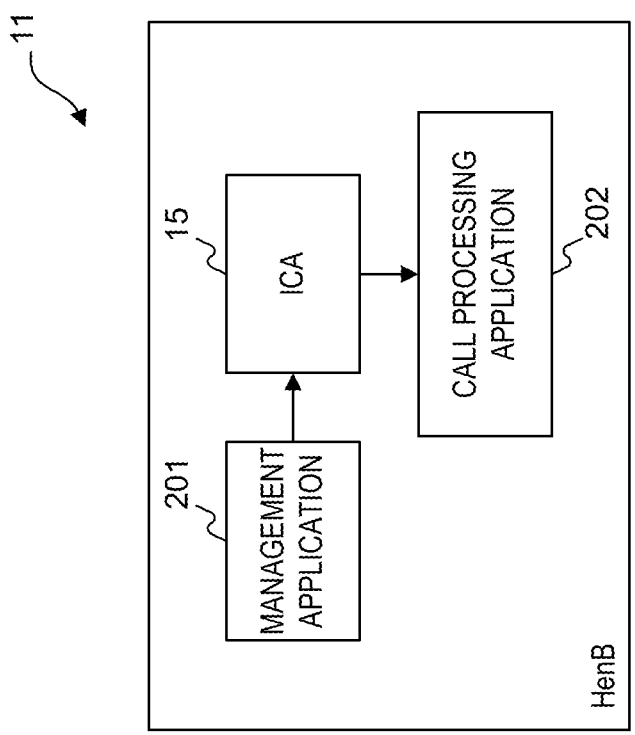
FIG. 2 illustrates an exemplary architecture for an HeNB.
Figure 3:
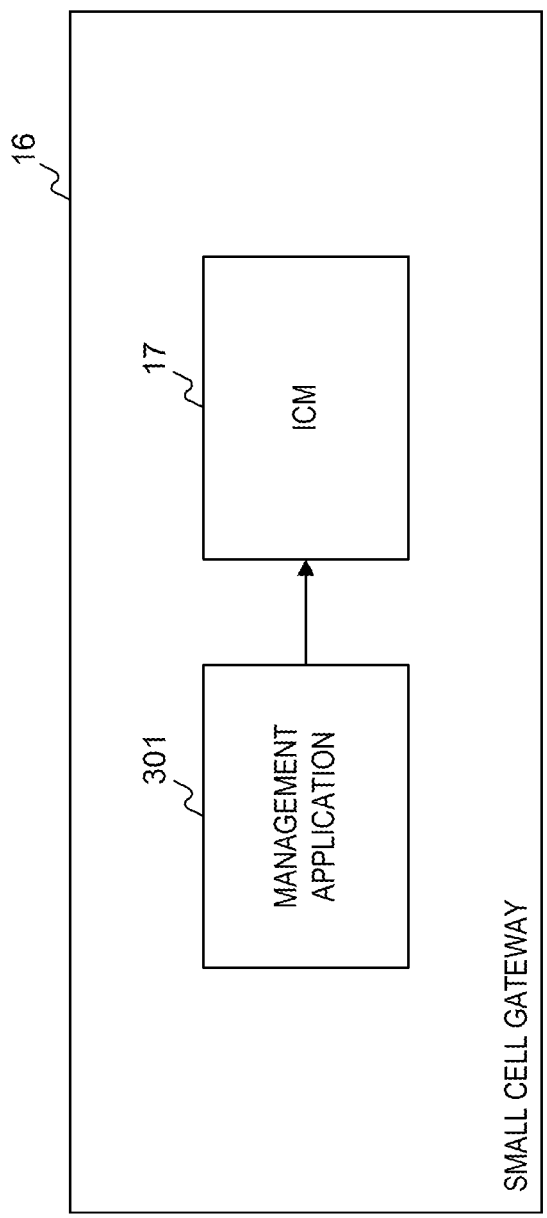
FIG. 3 illustrates an exemplary architecture for a small cell gateway.
Figure 4A:
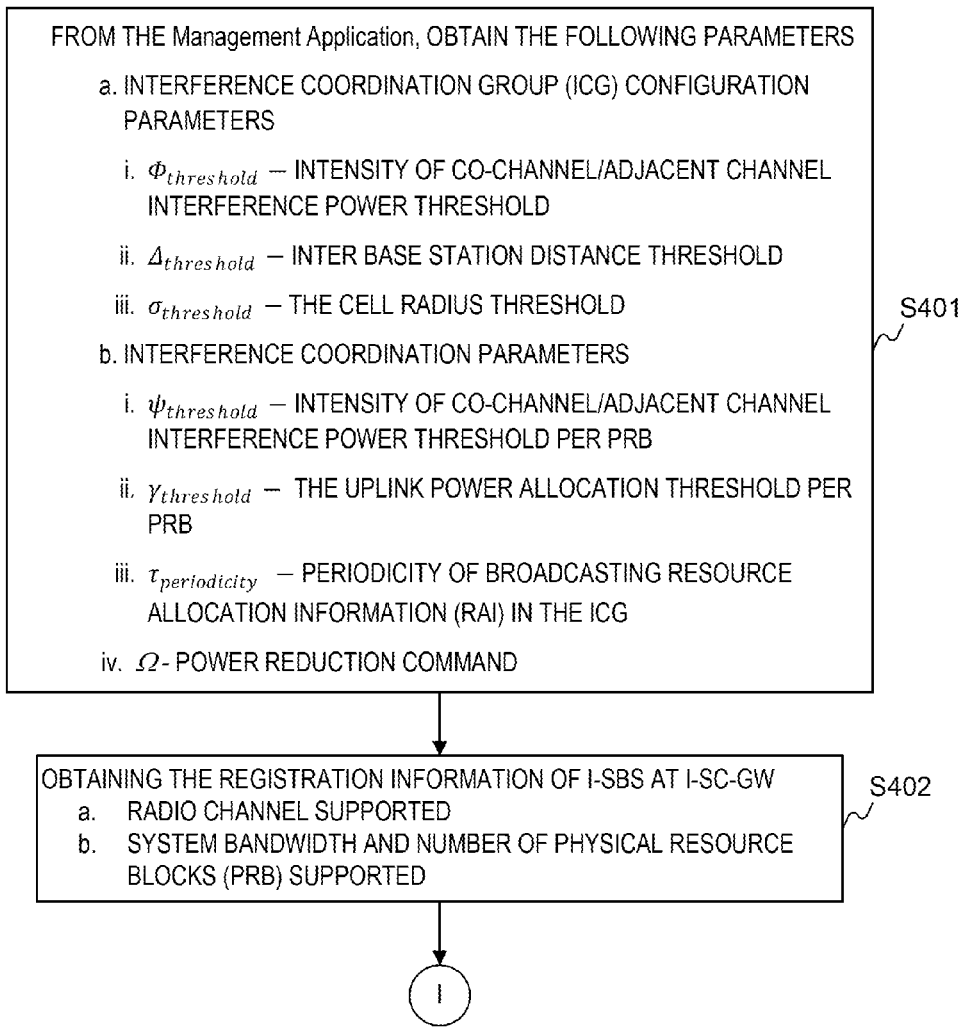
FIG. 4A is a flow chart of an exemplary machine algorithm for inter-cell interference coordination.
Figure 4B:
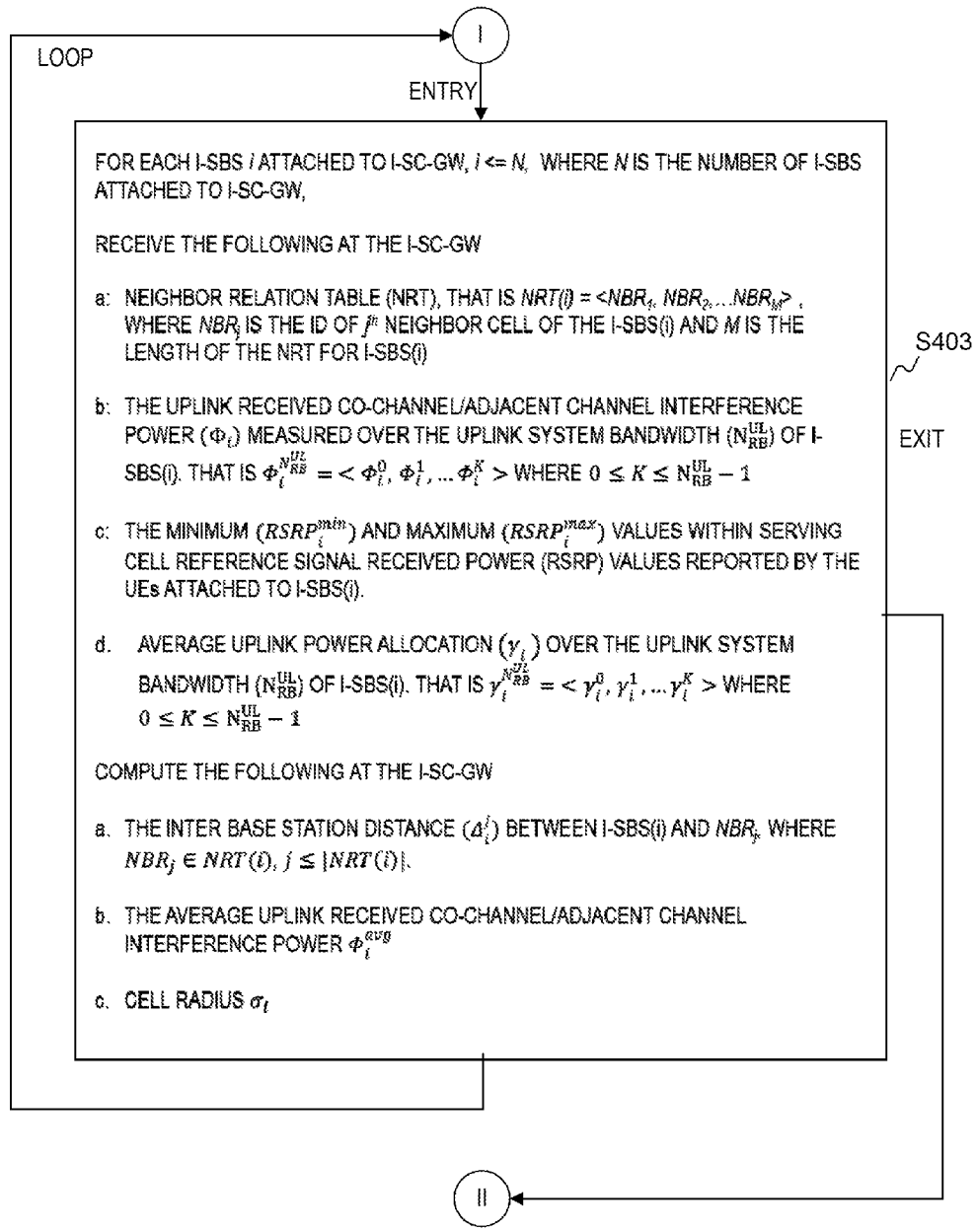
FIG. 4B is a continuation of the machine algorithm of FIG. 4A setting forth additional exemplary steps.
Figure 4C:
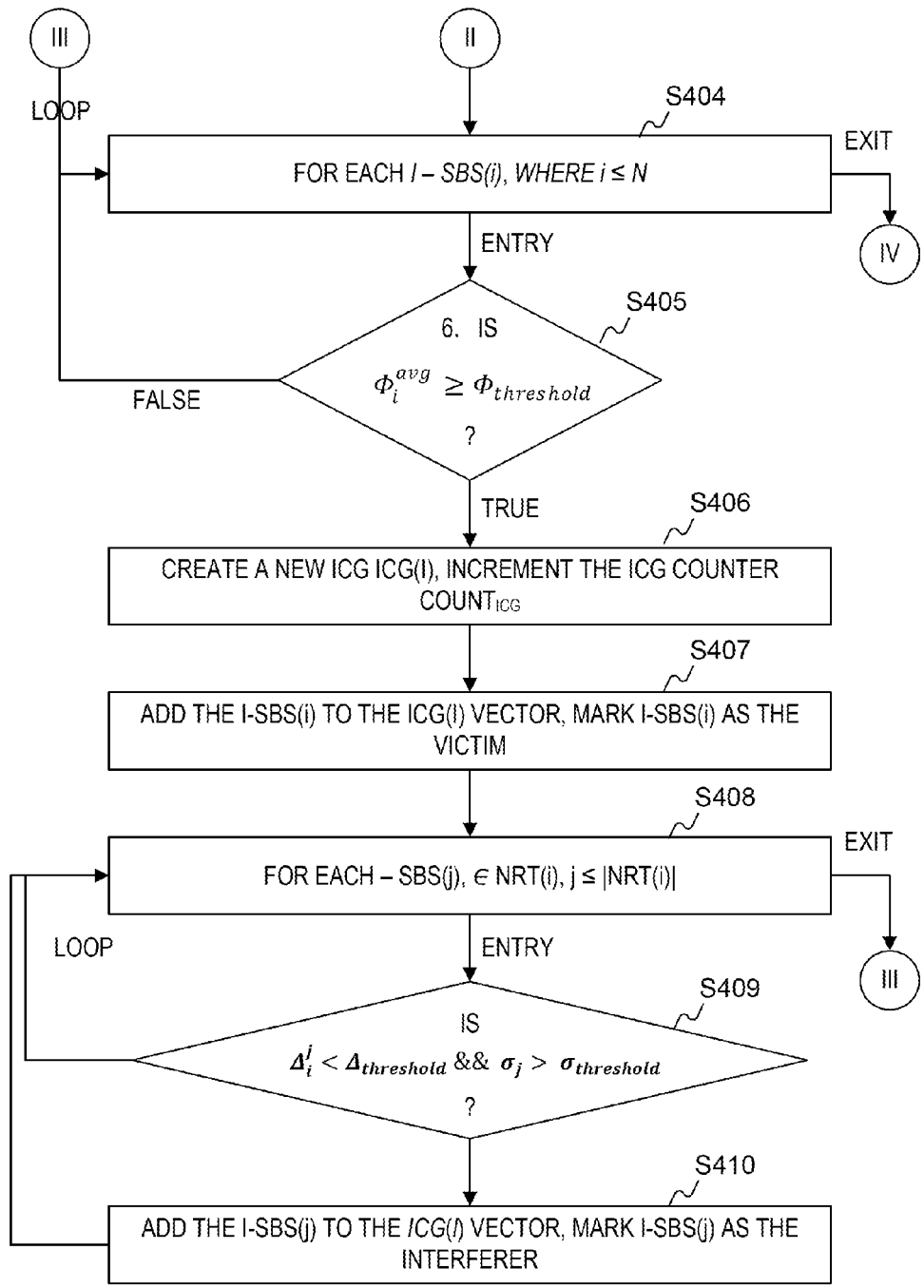
FIG. 4C is a further continuation of the machine algorithm of FIG. 4A setting forth additional exemplary steps.
Figure 4D:
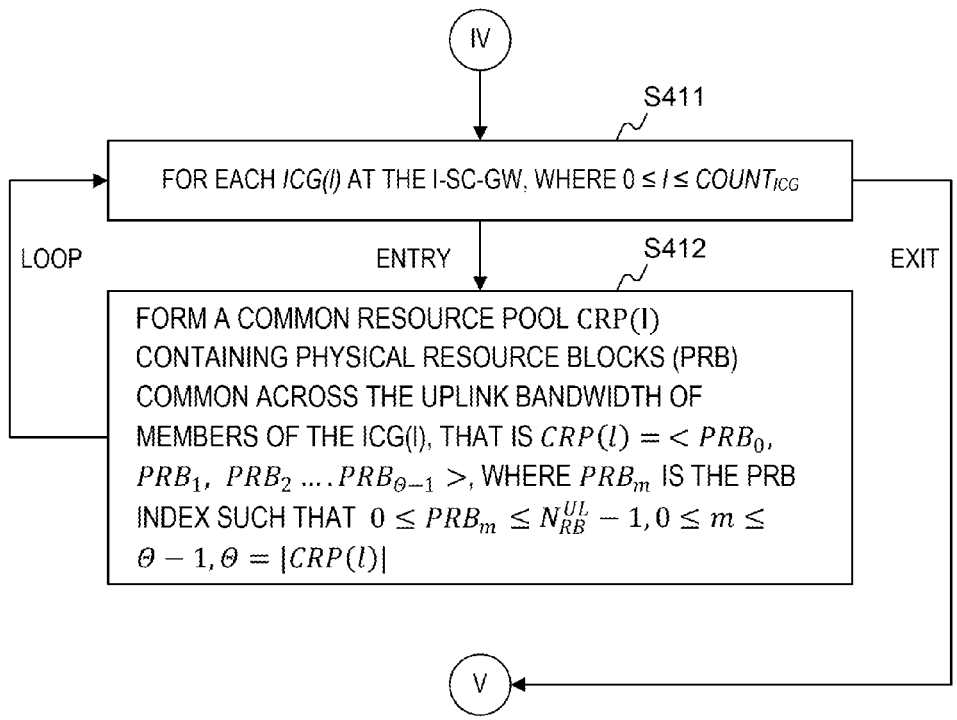
FIG. 4D is an even further continuation of the machine algorithm of FIG. 4A setting forth additional exemplary steps.
Figure 4E:
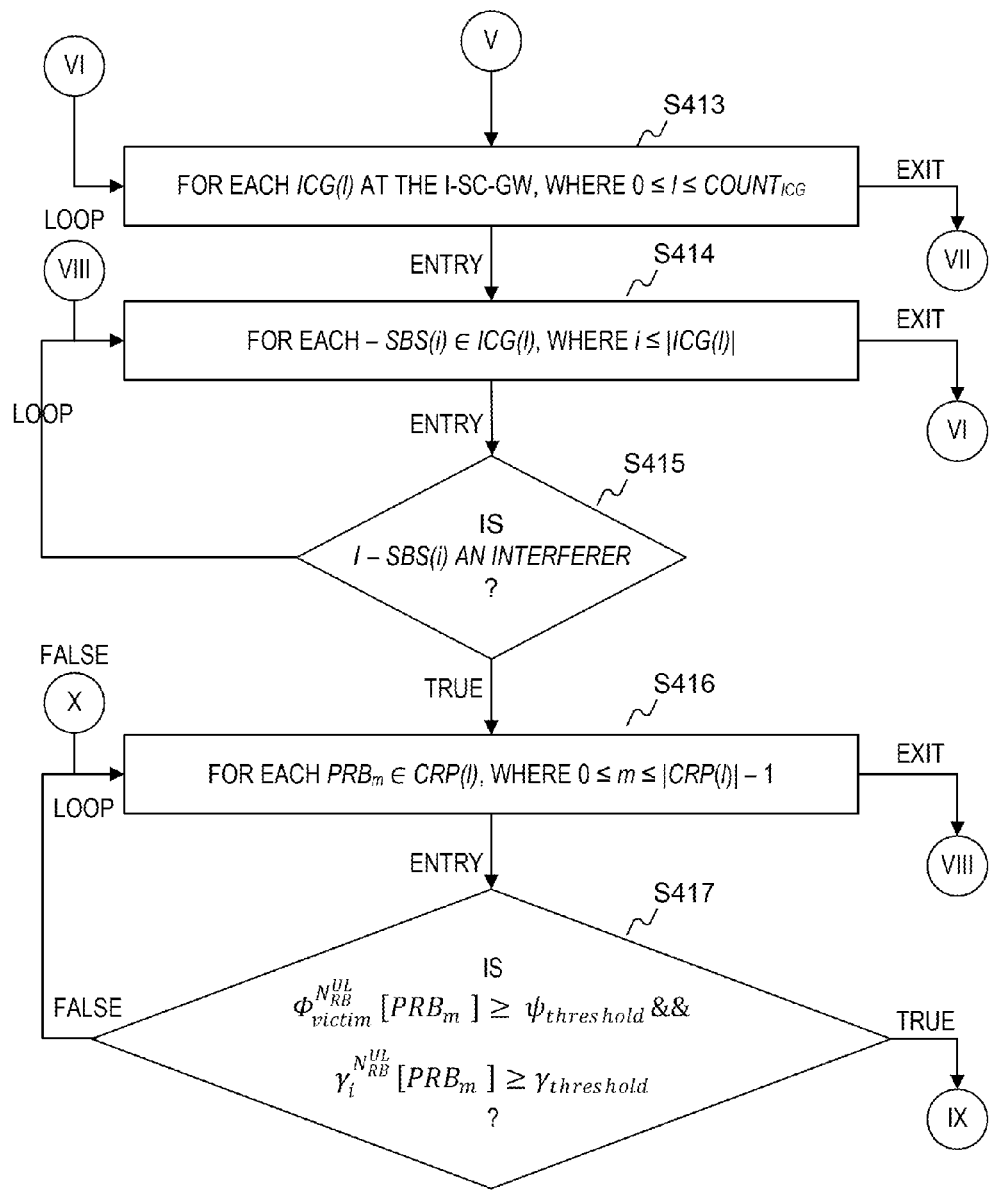
FIG. 4E is an even further continuation of the machine algorithm of FIG. 4A setting forth additional exemplary steps.
Figure 4F:
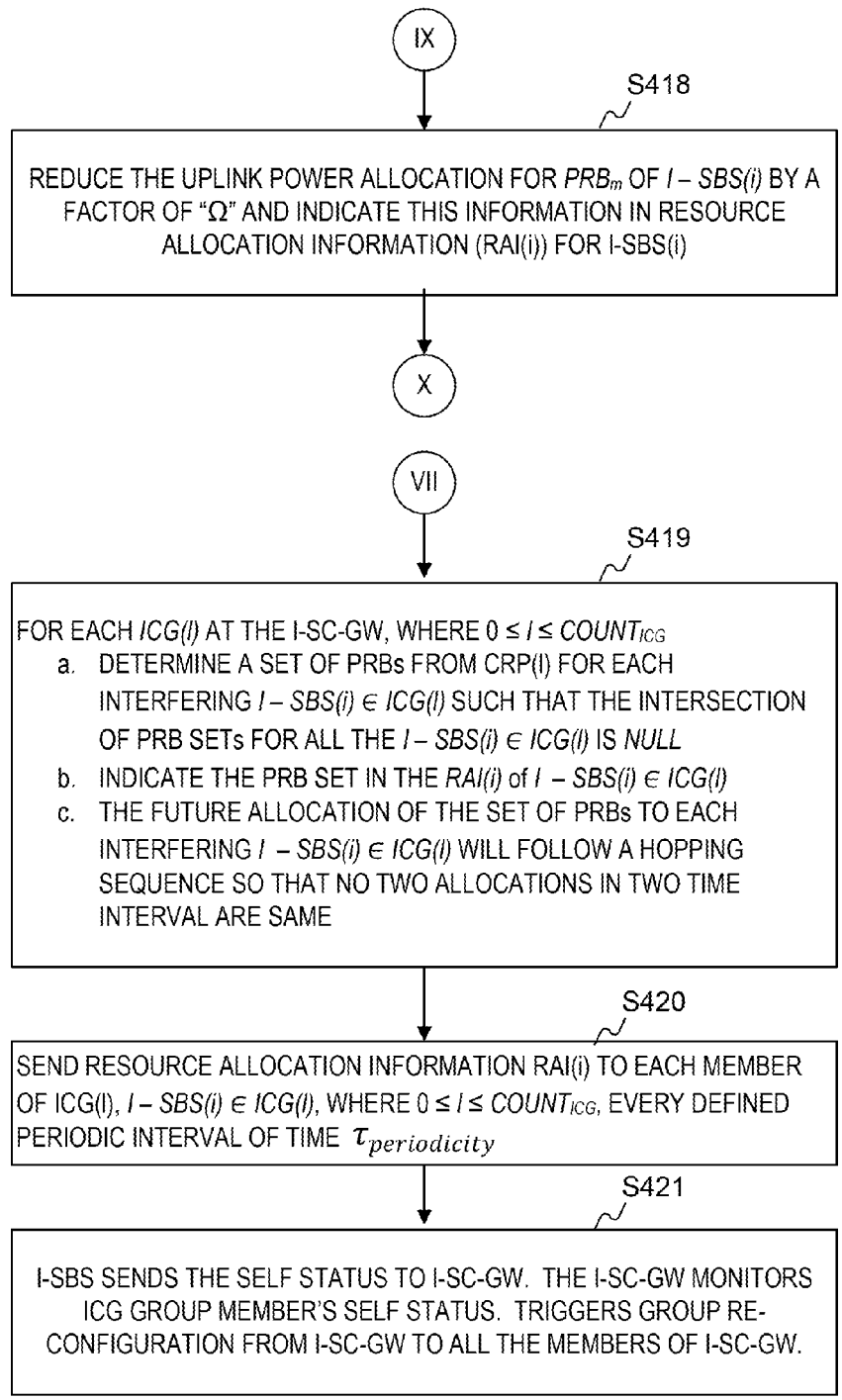
FIG. 4F is an even further continuation of the machine algorithm of FIG. 4A setting forth additional exemplary steps.

To provide an improved inter-cell interference coordination mechanism that does not place the entire burden of interference coordination on the HeNB 11, an exemplary Interference Coordination Agent (ICA) 15 may be provided in HeNB 11 and an exemplary Interference Coordination Manager (ICM) 17 may be provided in the SC-GW 16. While FIG. 1 illustrates that the ICA 15 may be provided in HeNB 11 and ICM 17 may be provided in SC-GW 16, ICA 15 and ICM 17 may be provided in other locations. For example, ICA 15 and ICM 17 may be provided in dedicated units separate from HeNB 11 and SC-GW 16, respectively. An exemplary implementation of the ICA 15 in HeNB 11 is illustrated in FIG. 2 and an exemplary implementation of the ICM 17 in SC-GW 16 is illustrated in FIG. 3. Detailed operations of the ICA 15 and ICM 17 are explained with reference to FIGS. 4A-4F.

As shown in FIG. 2, HeNB 11 may include, among other things, a management application 201, ICA 15, and call processing application 202. Each of these components may reside as code in memory or as dedicated circuitry on the same or different hardware processors in HeNB 11. Management application 201 may allow the operator or manager of HeNB 11 to specify parameters for HeNB 11 used for radio resource management. ICA 15 may obtain and store context data for HeNB 11 such as a neighbor relation table, operating channel bandwidth information, uplink interference power, etc. For example, the operating channel bandwidth may specify the physical resource blocks that constitute the uplink channel bandwidth for a given HeNB 11. A physical resource block may be formed, for example, of a group of 12 subcarriers in LTE. Each of these context data will be described in greater detail with reference to FIGS. 4A-4F.

ICA 15 may transmit some or all of this context data to SC-GW 16 and, more particularly, to ICM 17 (explained in detail with reference to FIGS. 3 and 4A-4F). ICA 15 may receive an interference coordination decision from ICM 17 that may include resource allocation information (RAI) for HeNB 11. The RAI received from ICM 17 may indicate, for example, an adjustment to the power allocation for one or more physical resource blocks (PRBs) in a given HeNB 11's uplink system bandwidth. ICA 15 may initiate an enforcement command to call processing application 202 to enforce the interference coordination decision by ICM 17. Call processing application 202 may interface with UE 14 and execute the interference coordination decision. Call processing application 201 may also report a status of execution of the interference coordination to ICA 15, which may report the status to ICM 17.

FIG. 3 illustrates an exemplary configuration for the SC-GW 16. SC-GW 16 may include management application 301 and ICM 17. Each of these components may reside as code in memory or as dedicated circuitry on the same or different hardware processors in SC-GW 16. Management application 301 may allow the operator or manager of SC-GW 16 to specify certain parameters for SC-GW 16 that the ICM 17 may use to implement the inter-cell interference coordination process. For example, using the specified parameters (which are discussed in further detail with reference to FIGS. 4A-4F), ICM 17 may determine one or more interference coordination groups, each of which may include a victim SCBS 11 (or HeNB 11) that is interfered by one or more other interfering SCBSs 11. For each of the interference coordination groups, ICM 17 may determine one or more adjustments that can be made in the power allocation and/or hopping sequence for the SCBSs 11 to minimize the interference experienced by the victim SCBS 11.

FIGS. 4A-4F illustrate in detail an exemplary machine algorithm describing exemplary functionality of ICA 15 and ICM 17 consistent with the disclosed embodiments. Certain steps in the machine algorithm may be executed by ICA 15 while others by ICM 17. The process is distributed over FIGS. 4A-4F where circles with roman numerals therein indicate the continuity between the different figures. To explain the functionality of ICA 15 and ICM 17, consider the following scenario. Four SCBSs 11 or HeNBs 11 (B1, B2, B3, and B4) are connected to SC-GW 16. Suppose, the uplink bandwidth is as follows: B1=3 MHz; B2=1.4 MHz; B3=5 MHz; and B4=10 MHz.

In LTE, for example, the usable PRB indexes (each P(i) indicates one PRB) spanning the uplink bandwidth of the SCBSs 11 may be as follows:
  i. B1=<P0, P1, . . . , P14>;
  ii. B2=<P0, P1, . . . , P5>;
  iii. B3=<P0, P1, . . . , P24>; and
  iv. B4=<P0, P1, . . . , P49>;

In S401, ICM 17 may obtain one or more of the following parameters from management application 301 that may be grouped into (1) interference coordination group configuration parameters and (2) interference coordination parameters. As explained in detail in the steps to follow, the interference coordination group configuration parameters may be utilized by ICM 17 to form one or more interference coordination groups (hereinafter referred to as "ICGs"), and the interference coordination parameters may be utilized by ICM 17 to execute inter-cell coordination between SCBSs in the ICGs.

Interference Coordination Group Configuration Parameters $\Phi_{threshold}$—intensity of co-channel/adjacent channel interference power threshold;

$\Delta_{threshold}$—inter base station distance threshold; and
$\sigma_{threshold}$—cell radius threshold;

Interference Coordination Parameters $\psi_{threshold}$—intensity of co-channel/adjacent channel interference power threshold per physical resource block (PRB);

$\gamma_{threshold}$—uplink power allocation threshold per PRB; and
$\tau_{periodicity}$—periodicity of broadcasting resource allocation information (RAI) in the ICG.

As each of the four SCBSs 11 (B1, B2, B3, and B4) are registered at SC-GW 16, in S402, ICM 17 may obtain the radio channel supported by each of the SCBSs 11, the system bandwidth, and number of PRBs supported by the four SCBSs 11. Accordingly, ICM 17 may obtain the exemplary PRB index distribution for each of the SCBSs 11 set forth above.

In S403, each of the SCBSs 11 (B1, B2, B3, and B4) may transmit the following information to ICM 17:
  i. Neighbor relation Table (NRT);
  ii. Uplink received Co-channel & Adjacent Channel interference power measured for the whole system bandwidth; and
  iii. Minimum and Maximum RSRP (Reference Signal Received Power) values reported by the UEs attached to the SCBS 11;
  iv. Average uplink power allocation over the uplink system bandwidth The NRT (also referred to as "neighboring cell information") may indicate information as to who the neighboring SCBSs 11 are for a given SCBS 11. For example, B1 may indicate that B2, B3, and B4 are its neighbors. Hence, the NRT of B1 may be <B2, B3, B4>. B2 may indicate, for example, that its NRT includes <B1, B3, B4, B5> where B5 may be an SCBS 11 attached to another SC-GW 16 or the same SC-GW 16 as B1.

The uplink received co-channel & adjacent channel interference power ($\Phi i$) may indicate the uplink interference power experienced by an SCBS 11 over its uplink system bandwidth. For example, B1 may indicate the uplink interference power experienced in each of its PRBs P0 thru P14. Hence, in FIG. 4B, K may be 14 for B1 and i may be 1 for B1.

The maximum and minimum RSRP values may correspond to the maximum and minimum values experienced by UEs connected to the SCBS 11. For example, if three UEs are connected to B1, then B1 may determine the RSRP values for each of the three UEs and send the maximum and minimum values from among the three values.

The uplink power allocation ($\gamma$) may indicate the power allocated by each of the SCBSs 11 for each of the PRBs. For example, $\gamma$ for B1 may indicate the average power allocated by B1 for each of its PRBs P0 thru P14. It will be noted that different SCBSs may allocate different uplink power for the same PRB index. For example, PRB index P0 is used by both SCBSs B1 and B3 but they may allocate different uplink power for P0.

Having received the above information from each of the SCBSs 11, ICM 17 may compute the following parameters for each of the SCBSs 11:
  i. Inter base station distance between an SCBS 11 and each of its neighbors specified in the NRT. So, for example, ICM 17 may compute the inter base station distance ($\Delta$) between B1 and B2, B1 and B3, B1 and B4 as B2, B3, B4 are specified in the NRT for B1.
  ii. Average uplink interference power experienced across the uplink system bandwidth. For example, for B1, ICM 17 may compute $\Phi_1^{avg}$ as the average of the uplink interference powers across its PRBs P0 thru P14.
  iii. Cell radius $\sigma$ for the SCBS 11 from the maximum and minimum RSRP values for the SCBS 11.

After determining the above information, ICM 17 may proceed to form interference coordination groups (ICGs). For example, ICM 17 may cycle through each of SCBSs 11 (here, B1 through B4) and determine whether any of the SCBSs 11 is a victim SCBS in that it is experiencing a significant amount of interference from one or more of its neighbors (B2, B3, and B4). Having determined a victim SCBS 11, ICM 17 may determine the SCBSs 11 that are interfering with the victim SCBS 11. The victim SCBS 11 and the interfering SCBSs 11 may form one ICG. The above formation of an ICG is described with reference to S404 thru S410.

In S404, ICM 17 may begin executing a loop that goes through each SCBS 11. N in S404 may be four in the exemplary scenario discussed here because SC-GW 16 is connected to four SCBSs. In S405, ICM 17 may determine whether the SCBS 11 selected in an iteration of S404 is a victim SCBS. ICM 17 may determine an SCBS 11 to be a victim SCBS if for, example, the average uplink interference power determined in S403 for that SCBS is greater than a threshold value. For example, ICM 17 may determine that B1 is a victim SCBS if $\Phi_1^{avg}$ is greater than $\Phi_{threshold}$. If ICM 17 determines that B1 is not a victim in S405, ICM 17 may proceed back to S404 and select the next SCBS 11 (for example, B2).

If ICM determines that B1 is a victim SCBS, ICM 17 may create a new ICG and increment an ICG counter in S406. In S407, ICM 17 may add B1 (the victim SCBS in this example) to the ICG and mark B1 as the victim.

Next, ICM 17 may identify all SCBSs that are interfering with B1. For example, ICM 17 may execute a loop in S408 that looks at each of B1's neighbors specified in B1's neighboring cell information or NRT and determines in S409 whether both the following conditions are true for the neighboring SCBS:

i. whether the inter base station distance between B1 and the neighboring SCBS is less than a threshold value ($\Delta_{threshold}$) specified by the operator ii. whether the neighboring SCBS's cell radius is greater than a threshold value ($\sigma_{threshold}$) specified by the operator.

If both conditions are satisfied in S409, then in S410, ICM 17 may add that neighboring SCBS 11 to the ICG for B1 (the victim SCBS here) and mark the neighboring SCBS 11 as an interferer. If the conditions are not satisfied in S409, ICM 417 may repeat step 409 for the next neighboring SCBS until the conditions have been met for all neighboring SCBSs of B1.

Once the conditions have been met for all neighboring SCBSs of the victim SCBS (here, B1), control may proceed back to S404 where ICM 17 may now check whether the next SCBS (B2) is a victim. If B2 is a victim, a new ICG may be formed and the above steps repeated. The loop of S404 may continue to repeat until all the SCBSs have been exhausted for SC-GW 16.

Now assume that S404 thru S410 yield two ICGs. Assume that a first ICG has victim SCBS as B1 with B2, B3, and B4 as the interferers. Also assume that a second ICG has victim SCBS as B4 with B2 and B3 as interferers. Once the ICGs have been formed, ICM 17 may determine a common resource pool (CRP) for each of the ICGs by executing S411 and S412. A common resource pool (CRP) for an ICG may be constituted by the PRBs that are common across all the SCBSs constituting the ICG. For example, for the first ICG in the example above, the CRP may include all PRBs that are common for B1, B2, B3, and B4. For the second ICG, the CRP may include all PRBS that are common for B2, B3, and B4. For the following system bandwidth, i. B1=<P0, P1, . . . , P14>;
ii. B2=<P0, P1, . . . , P5>;
iii. B3=<P0, P1, . . . , P24>; and
iv. B4=<P0, P1, . . . , P49>, the CRP for ICG(1) will be, for example, CRP(1)=<P0, P1, . . . , P5>

Having determined the ICGs, ICM 17 may determine how to execute interference coordination for each of the ICGs. ICM 17 may execute a first loop (S413) for each of the ICGs. In the first loop for an ICG, ICM 17 may execute a second loop (S414) for each constituent SCBS of the ICG. In the second loop, ICM 17 may check whether the SCBS is an interferer in S415. If the SCBS is determined to be an interferer in S415, a third loop (S416) may be executed for each of the PRBs in the CRP of the ICG. In the third loop, ICM 17 may check the following two conditions in S417:

i. whether the uplink interference power experienced by the victim SCBS for that PRB is greater than the threshold value ($\psi_{threshold}$) for the uplink interference power specified by the operator; and ii. whether the uplink power allocated by the interfering SCBS for that PRB is greater than the threshold value ($\gamma_{threshold}$) for uplink power allocation per PRB specified by the operator.

If each of the two conditions is satisfied in S417, ICM 17 may reduce the uplink power allocation for that PRB of the interfering SCBS by some factor and indicate this information in the RAI for the interfering SCBS.

The above description for steps 413 through 418 will become clear by taking the following example. In S413, ICM 17 may enter the first loop for ICG(1). In the second loop of S414 and S415, ICM 17 may determine that B2 is an interferer for ICG(1). Hence, ICM 17 may execute the third loop for B2 for each of PRBs P0 thru P5 of ICG(1). For example, in S417, ICM 17 may check whether the uplink interference power experienced by victim SCBS B1 in PRB P0 is greater than a corresponding threshold value and whether the uplink power allocated by interferer B2 in PRB P0 is greater than the corresponding threshold value. If the conditions are true in S417, then in S418, ICM 17 may reduce the uplink power allocated by interferer B2 for PRB P0 and indicate this reduction in B2's RAI. Next, ICM 17 may execute S417 for the next PRB, P1 and so on. Once, all the PRBs of the CRP(1) are exhausted, ICM 17 may execute S416-S418 for the next interferer, B3.

In addition to adjusting the uplink power allocation of individual SCBSs in certain PRBs, ICM 17 may determine (S419), for each ICG, a non-overlapping set of PRBs from the corresponding CRP for each constituent SCBS of the ICG. For example, for CRP(1) corresponding to ICG(1), the CRP includes 6 PRBs (P0 thru P5) and ICG (1) includes 4 SCBSs (B1 thru B4). Therefore, in S419, four non-overlapping sets of PRBs may be determined and assigned to each of the SCBSs in the ICG. For example, PRBs P0, P1, P2 may be assigned to B1, PRB P3 may be assigned to B2, PRB P4 may be assigned to B3, and PRB P5 may be assigned to B4. This assignment may be indicated in the RAI of each of the SCBSs. It will be understood that the above PRB allocation is only an example and any non-overlapping allocation may be assigned by ICM 17. Moreover, the allocation decision may be optimized by ICM 17 by using an optimization algorithm.

In S420, ICM 417 may send the RAIs to the respective SCBSs. The RAI may be sent periodically at time interval $\tau_{periodicity}$. Additionally, the PRB assignment of S419 may be hopped at the same or different time interval. For example, after one time interval $\tau_{periodicity}$, the PRB assignment may be hopped: B1 may be assigned PRBs P3, P4, P5, B2 may be assigned PRB P0, B3 may be assigned PRB P1, and B4 may be assigned PRB P2.

At S421, each of the SCBSs 11 connected to SC-GW 16 may communicate their status to SC-GW 16 and SC-GW 16 (more particularly, ICM 17) may monitor the interference amongst the SCBSs 11 and execute steps 401 thru 420 as required.

The above described exemplary techniques may provide interference coordination using a centralized location point (for example, SC-GW). By determining and providing the SCBSs with, for example, the PRB power allocation and hopping sequence, the SC-GW may offload the processing required for interference coordination from the SCBSs.

Figure 5:
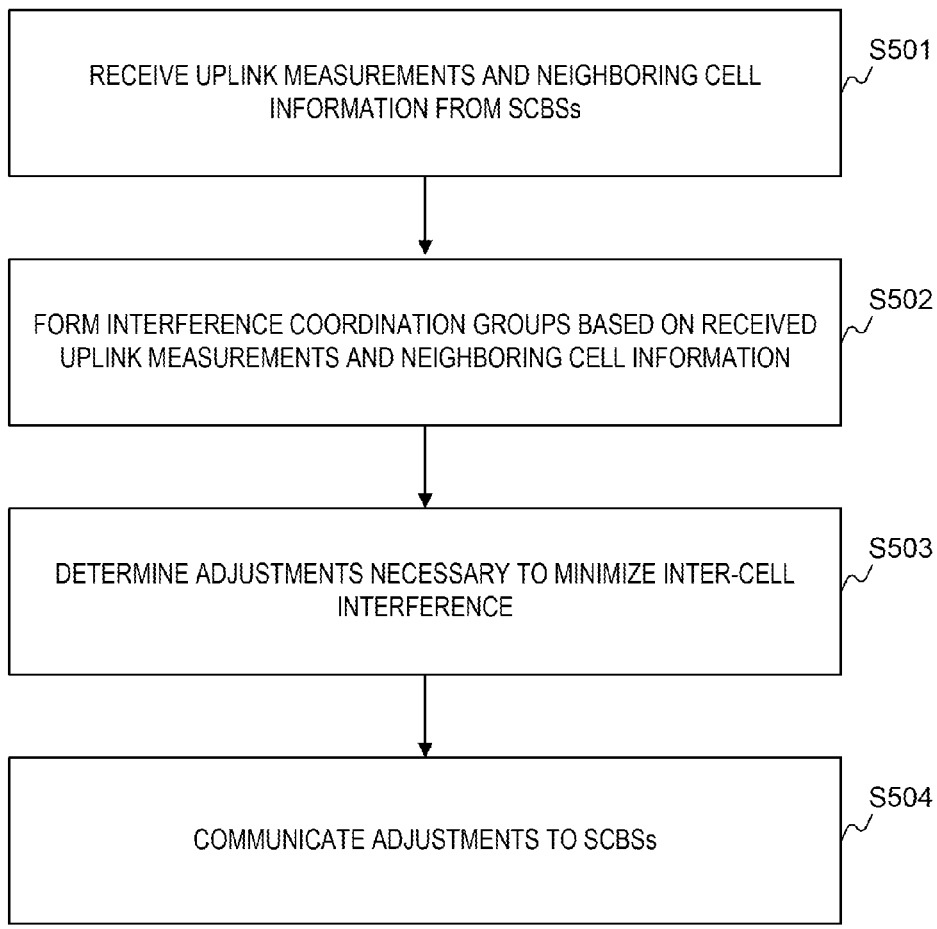
FIG. 5 is an exemplary machine algorithm that is an overview of the inter-cell coordination process.

FIG. 5 is an exemplary overview of the interference coordination techniques disclosed herein. In S501, SC-GW 16 (and more particularly, ICM 17) may receive uplink measurements and neighboring cell information from SCBSs 11 connected to SC-GW 16. For example, if SCBSs B1, B2, B3, and B4 are connected to SC-GW 16, the ICM 17 may receive from the ICA 15 of these SCBSs, uplink measurements and neighboring cell information like in S403 of FIG. 4B. The uplink measurements transmitted by each of the SCBSs may include: (a) uplink received co-channel & adjacent channel interference power measured for the whole uplink system bandwidth of the SCBS; (b) minimum and maximum RSRP values reported by the UEs attached to the SCBS; and (c) average uplink power allocation over the uplink system bandwidth. As discussed with respect to S403 in FIG. 4B, the uplink interference power and uplink power allocation may be specified by the SCBS for each of the SCBS's PRBs.

In S502, ICM 17 may form ICGs based on the information received in S501. For example, ICM 17 may retrieve from management application 301, one or more ICG configuration parameters specified in S401 of FIG. 4A and the parameters specified in S402 of FIG. 4A. By utilizing these retrieved parameters, ICM 17 may form one or more ICGs, each of which may include a victim SCBS and one or more SCBSs interfering with the victim SCBS. For example, as discussed above with reference to FIGS. 4A-4F, an ICG may be formed with B1 as the victim SCBS and B2, B3, and B4 as the interfering SCBSs. To form the ICG, ICM 17 may execute, for example, S404 thru S411 of FIG. 4B-4C. For each ICG, ICM 17 may also determine a CRP that consists of one or more PRBs that are common across all the members of that ICG.

In S503, ICM 17 may determine adjustments necessary to minimize inter-cell interference in the different ICGs formed in S502. For example, ICM 17 may execute S413 thru S419 of FIGS. 4E and 4F to determine uplink power allocation adjustments for interfering SCBSs. Additionally, as discussed in S419, ICM 17 may determine a hopping sequence of non-overlapping PRBs for SCBSs of an ICG so that at a given time each SCBS that is a member of a given ICG may not utilize the same PRBs for communication with their respective UEs.

In S504, ICM 14 may communicate the adjustments determined in S503 to the various SCBSs by specifying the adjustments in the RAI of the SCBSs. As discussed in S420 of FIG. 4F, the transmission of the RAI may occur at predetermine intervals that may coincide with the hopping sequence determined in S503.

While exemplary machine algorithms have been described with reference to FIGS. 4A-4F and 5, it will be understood that certain exemplary embodiments may change the order of steps in the machine algorithms or may even eliminate or modify certain steps, or include additional or different steps. For example, in FIGS. 4A-4F, S401 and S402 may be executed in ICM 17 after or in parallel with S403. Moreover, the different components of SCBS 11 and SC-GW 16 may be embodied in hardware or software or a combination of both. The hardware may include a general-purpose computer having a central processing unit (CPU) and memory/storage devices that store data and various programs such as an operating system and one or more application programs. Furthermore, each of the steps in the machine algorithms described in FIGS. 4A-4F and 5 may be embodied as computer-readable instructions or code and stored in a non-transitory computer-readable storage medium for execution by a computer.

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

What is claimed is:

1. A method of managing inter-cell interference in a wireless network, the method executed by at least one processor at a small cell gateway and comprising:
receiving, by the at least one processor, uplink interference power corresponding to a first small cell base station (SCBS);
receiving, by the at least one processor, neighboring cell information of the first SCBS, the neighboring cell information including information on a first plurality of SCBSs neighboring the first SCBS;
determining, by the at least one processor, based on the received uplink interference power, that the first SCBS is experiencing inter-cell interference;
in response to determining that the first SCBS is experiencing inter-cell interference, determining, by the at least one processor, a second plurality of SCBSs from among the first plurality of SCBSs that are interfering with the first SCBS; and
adjusting, by the at least one processor, uplink power allocation corresponding to a second SCBS from among the second plurality of SCBSs,
wherein a first interference coordination group is formed including the first SCBS and the second plurality of SCBSs, and
wherein a common resource pool is determined for the first interference coordination group, the common resource pool including at least one physical resource block that is common across the first SCBS and the second plurality of SCBSs.

2. The method of claim 1, wherein receiving uplink interference power corresponding to the first SCBS includes receiving uplink interference power for each of a plurality of physical resource blocks in the first SCBS uplink bandwidth.

3. The method of claim 2, wherein determining that the first SCBS is experiencing inter-cell interference includes:
determining an average uplink interference power corresponding to the first SCBS by averaging the received uplink interference powers for the plurality of physical resource blocks in the first SCBS bandwidth; and
determining that the first SCBS is a victim SCBS based on the determined average uplink interference power exceeding a threshold uplink interference power.

4. The method of claim 1, wherein determining the second plurality of SCBSs from among the first plurality of SCBSs that are interfering with the first SCBS includes:
determining a distance between the first SCBS and each of the first plurality of SCBSs based on the received neighboring cell information; and
determining a cell radius for each of the first plurality of SCBSs.

5. The method of claim 4, wherein the determined distance and cell radius for each of the second plurality of SCBSs exceeds a threshold value.

6. The method of claim 1, wherein adjusting the uplink power allocation includes adjusting the uplink power allocated to the at least one physical resource block by the second SCBS.

7. The method of claim 1, wherein adjusting the uplink power allocation includes determining that:
the uplink interference power corresponding to the at least one physical resource block of the first SCBS is greater than a first threshold value; and the uplink power allocated to the at least one physical resource block by the second SCBS is greater than a second threshold value.

8. The method of claim 7, wherein adjusting the uplink power allocation includes adjusting the uplink power allocated to the at least one physical resource block by the second SCBS.

9. A non-transitory computer-readable storage medium storing instructions which when executed by at least one processor of a small cell gateway enables the at least one processor to execute a method of managing inter-cell interference in a wireless network, the method comprising:
   receiving, by the at least one processor, uplink interference power corresponding to a first small cell base station (SCBS);
   receiving, by the at least one processor, neighboring cell information of the first SCBS, the neighboring cell information including information on a first plurality of SCBSs neighboring the first SCBS;
   determining, by the at least one processor, based on the received uplink interference power, that the first SCBS is experiencing inter-cell interference;
   in response to determining that the first SCBS is experiencing inter-cell interference, determining, by the at least one processor, a second plurality of SCBSs from among the first plurality of SCBSs that are interfering with the first SCBS; and
   adjusting, by the at least one processor, uplink power allocation corresponding to a second SCBS from among the second plurality of SCBSs,
   wherein a first interference coordination group is formed including the first SCBS and the second plurality of SCBSs, and
   wherein a common resource pool is determined for the first interference coordination group, the common resource pool including at least one physical resource block that is common across the first SCBS and the second plurality of SCBSs.

10. The non-transitory computer-readable storage medium of claim 9, wherein receiving uplink interference power corresponding to the first SCBS includes receiving uplink interference power for each of a plurality of physical resource blocks in the first SCBS uplink bandwidth.

11. The non-transitory computer-readable storage medium of claim 10, wherein determining that the first SCBS is experiencing inter-cell interference includes: determining an average uplink interference power corresponding to the first SCBS by averaging the received uplink interference powers for the plurality of physical resource blocks in the first SCBS bandwidth; and
   determining that the first SCBS is a victim SCBS based on the determined average uplink interference power exceeding a threshold uplink interference power.

12. The non-transitory computer-readable storage medium of claim 9, wherein determining the second plurality of SCBSs from among the first plurality of SCBSs that are interfering with the first SCBS includes:
   determining a distance between the first SCBS and each of the first plurality of SCBSs based on the received neighboring cell information; and
   determining a cell radius for each of the first plurality of SCBSs.

13. The non-transitory computer-readable storage medium of claim 12, wherein the determined distance and cell radius for each of the second plurality of SCBSs exceeds a threshold value.

14. The non-transitory computer-readable storage medium of claim 9, wherein adjusting the uplink power allocation includes adjusting the uplink power allocated to the at least one physical resource block by the second SCBS.

15. The non-transitory computer-readable storage medium of claim 9, wherein adjusting the uplink power allocation includes determining that:
   the uplink interference power corresponding to the at least one physical resource block of the first SCBS is greater than a first threshold value; and
   the uplink power allocated to the at least one physical resource block by the second SCBS is greater than a second threshold value.

16. The non-transitory computer-readable storage medium of claim 15, wherein adjusting the uplink power allocation includes adjusting the uplink power allocated to the at least one physical resource block by the second SCBS.

17. A system implemented at a small cell gateway for managing inter-cell interference in a wireless network, the system comprising:
   a memory storing instructions; and
   at least one processor configured by the instructions to:
   receive uplink interference power corresponding to a first small cell base station (SCBS);
   receive neighboring cell information of the first SCBS, the neighboring cell information including information on a first plurality of SCBSs neighboring the first SCBS;
   determine based on the received uplink interference power, that the first SCBS is experiencing inter-cell interference;
   in response to determining that the first SCBS is experiencing inter-cell interference, determine a second plurality of SCBSs from among the first plurality of SCBSs that are interfering with the first SCBS; and
   adjust uplink power allocation corresponding to a second SCBS from among the second plurality of SCBSs,
   wherein a first interference coordination group is formed including the first SCBS and the second plurality of SCBSs, and
   wherein a common resource pool is determined for the first interference coordination group, the common resource pool including at least one physical resource block that is common across the first SCBS and the second plurality of SCBSs.

18. The system of claim 17, wherein receiving uplink interference power corresponding to the first SCBS includes receiving uplink interference power for each of a plurality of physical resource blocks in the first SCBS uplink bandwidth.

19. The system of claim 18, wherein determining that the first SCBS is experiencing inter-cell interference includes: determining an average uplink interference power corresponding to the first SCBS by averaging the received uplink interference powers for the plurality of physical resource blocks in the first SCBS bandwidth; and
   determining that the first SCBS is a victim SCBS based on the determined average uplink interference power exceeding a threshold uplink interference power.

20. The system of claim 17, wherein determining the second plurality of SCBSs from among the first plurality of SCBSs that are interfering with the first SCBS includes: determining a distance between the first SCBS and each of the first plurality of SCBSs based on the received neighboring cell information; and determining a cell radius for each of the first plurality of SCBSs.

21. The system of claim 20, wherein the determined distance and cell radius for each of the second plurality of SCBSs exceeds a threshold value.

22. The system of claim 17, wherein adjusting the uplink power allocation includes adjusting the uplink power allocated to the at least one physical resource block by the second SCBS.

23. The system of claim 17, wherein adjusting the uplink power allocation includes determining that: the uplink interference power corresponding to the at least one physical resource block of the first SCBS is greater than a first threshold value; and
    the uplink power allocated to the at least one physical resource block by the second SCBS is greater than a second threshold value.

24. The system of claim 23, wherein adjusting the uplink power allocation includes adjusting the uplink power allocated to the at least one physical resource block by the second SCBS.

\* \* \* \* \*